(12) United States Patent
Jones, II et al.

(10) Patent No.: US 10,305,733 B1
(45) Date of Patent: May 28, 2019

(54) DEFINING SOFTWARE INFRASTRUCTURE USING A PHYSICAL MODEL

(71) Applicant: Amazon Technologies, Inc., Reno, NV (US)

(72) Inventors: Thomas Price Jones, II, Santa Cruz, CA (US); Kyle Adam Lichtenberg, II, Issaquah, WA (US)

(*) Notice: Subject to any disclaimer, the term of this patent is extended or adjusted under 35 U.S.C. 154(b) by 890 days.

(21) Appl. No.: 14/500,706

(22) Filed: Sep. 29, 2014

(51) Int. Cl.
*G06F 15/16* (2006.01)
*H04L 12/24* (2006.01)

(52) U.S. Cl.
CPC ............... *H04L 41/0813* (2013.01)

(58) Field of Classification Search
CPC .................................................. H04L 41/0813
USPC ............................................................ 709/224
See application file for complete search history.

(56) References Cited

U.S. PATENT DOCUMENTS

| | | | | |
|---|---|---|---|---|
| 2009/0276771 A1* | 11/2009 | Nickolov | ............... | G06F 9/4856 717/177 |
| 2012/0066687 A1* | 3/2012 | Briscoe | ............... | H04L 41/0806 718/104 |
| 2014/0130002 A1* | 5/2014 | AbdelAzim | ........ | G06F 17/5068 716/112 |

* cited by examiner

*Primary Examiner* — Normin Abedin
(74) *Attorney, Agent, or Firm* — Lee & Hayes, P.C.

(57) ABSTRACT

Functionality is disclosed herein for utilizing a physical model to define infrastructure associated with the service provider network or other networks. The model is analyzed to identify resources represented by the physical model as well as any connections between the resources. Based upon the analysis, configuration data that describes the configuration of the resources within the service provider network may be generated and used to perform one or more actions. For example, the configuration data might be used to generate a deployment template and/or used to provision the resources within the service provider network or other networks. After provisioning, the model may show information relating to the operation of the resources within the network.

20 Claims, 11 Drawing Sheets

DEFINING SOFTWARE INFRASTRUCTURE USING A PHYSICAL MODEL

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

It can sometimes be difficult for customers, or potential customers, of computing service providers such as those described above to define the infrastructure of an application or network. For example, a significant amount of manual technical effort may be required to define the resources to be utilized by an application as well as the interactions between resources within the network-based computing service. The technical effort required to define an infrastructure that is provisioned in a network-based computing service may be costly and time consuming and might, therefore, present a significant barrier to the utilization of network-based computing services to certain types of customers.

The disclosure made herein is presented with respect to these and other considerations.

DETAILED DESCRIPTION

Figure 1:
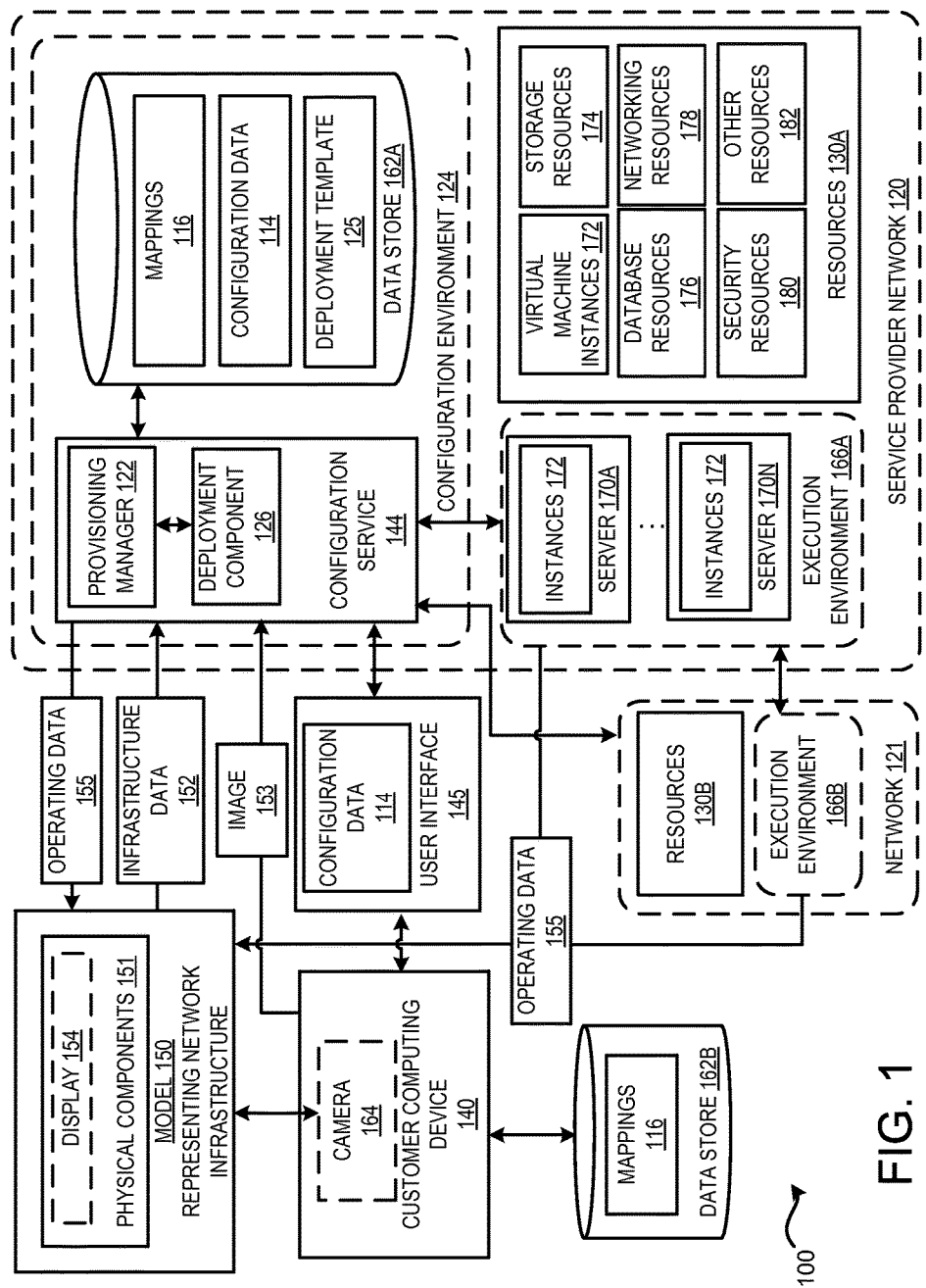
FIG. 1 is a block diagram depicting an illustrative operating environment in which a physical model may be used to define an infrastructure of an application that may be provisioned in a network.

The following detailed description is directed to technologies for using a physical model to define the infrastructure for an application that may be deployed in a network, such as a service provider network and/or other networks. A user, such as a customer of the service provider network, may assemble a physical model using physical components (e.g., blocks) to define the infrastructure of an application.

In some configurations, each block of a model may represent a type of resource provided by the network. Some example resources that might be associated with a component of the physical model include virtual computing resources, database resources, storage resources, security resources, auto-scaling resources, networking resources, and the like. A user may select from the components and assemble a physical model of the infrastructure. For example, a user might snap blocks together, place components on a "breadboard", or associate the components in some other manner (e.g., laying the blocks in an arrangement on a table). As used herein, the term "breadboard" may refer to a board that includes connection points to which physical components may be attached when assembling the model.

The physical components used to create the model may or may not be "smart." In some configurations, a physical component may be a simple block that does not include any electronics or processing capability. In other configurations, the physical components may be smart components that include processing capability. As used herein, the term "smart component" may be used to refer to a physical component (e.g., a block) that can communicate with another physical component (e.g., another block or some other computing device). In some examples, the smart components may include a display area for showing information relating to the provisioning or operating of the resource in the network. The smart components might also include hardware buttons that may be used to configure one or more parameters associated with a resource. For example, a user might use a hardware button to specify a number of servers to include in an auto-scale group or to specify an allowed port for a firewall resource. As another example, a user might push a hardware button a predetermined number of times to identify a size of a virtual machine instance (e.g., once for "small," twice for "medium" to indicate a four-core processor using 15 GB of memory).

In other examples, the parameters might be set by attaching additional blocks and/or other indicia to the physical model. For example, the use of one block may indicate a small virtual machine instance whereas two blocks snapped together (or placed near each other) may indicate a larger sized virtual machine instance. In other examples, a user might add an icon or some other graphic to a block that might be identified by an image processing system. For instance, a graphic indicating that a component is a "read only" storage component might be added to a storage block.

After assembling the model, the resources that are associated with the model might be provisioned in one or more networks. In some examples, infrastructure data is generated that indicates the desired resources to be configured and/or provisioned within the network as well as the connections between the resources in the assembled model. As discussed in more detail below, one or more of the smart components of the model might generate and provide (e.g., transmit) the infrastructure data to a configuration service. For example, a smart component might determine the components that are assembled in the model, determine the connections between the components and generate the infrastructure data using this information. In other examples, each smart component might provide infrastructure data to the configuration service. The connections might be indicated by direct connections (e.g., being snapped together), by a location of the components relative to each other, by a connector that connects the components, or the like. In other configurations, another computing device might generate and provide the infrastructure data. For example, an imaging device might analyze an image of the model using one or more image processing mechanisms to generate and provide the infrastructure data to the configuration service.

After identifying the resources and the connections between the resources in the model based on the infrastructure data, configuration data may be generated that describes a configuration of the infrastructure of the application within a network. The configuration service may be part of a network where the resources are to be provisioned, such as a service provider network, or part of another network. After obtaining the infrastructure data, the infrastructure data may be analyzed by the configuration service to generate configuration data that may be used in provisioning resources within one or more networks.

In some examples, the configuration data may be used to generate a deployment template. The deployment template might be used by a service provider network or another network to provision the identified resources. For example, the deployment template might be used by the service provider network to provision resources in another network that is associated with the service provider network. The deployment template might also be provided to a customer of the service provider network. For example, the deployment template may be provided to the customer for modification before the deployment template is used to provision or instantiate the infrastructure in the service provider network.

Once the configuration data describing the configuration of the infrastructure and/or the deployment template has been generated, portions of the configuration data or the deployment template might also be included in an appropriate interface, such as a user interface ("UI"), through which a user, such as the customer, can modify the data. For example, and without limitation, a user might be permitted to set one or more parameters of the resources identified from the model using the UI. Other types of interfaces, such as application programming interfaces ("APIs") or command line interfaces might also be provided through which a user can modify the configuration data.

The UI might also provide functionality for modifying the configuration data in other ways. For example, a user might be permitted to add, delete, or modify virtual machine instances, or other types of data processing resources, file or block data storage resources, database resources, networking resources, such as load balancing resources, domain name service ("DNS") resources, and virtual networking resources, security resources and/or other types of resources. In some examples, the deployment template might be shared with other users. In other examples, the user may provide a deployment template to one or more other users.

In some examples, the infrastructure is provisioned within the network(s). During operation, the model may provide an indication of how the resources of the model are operating. In some examples, the model receives operating data that may identify current state information about one or more of the resources associated with the model. For instance, smart components of the physical model may receive operating data and provide an indication (e.g., update a display) indicating the status of the resources (e.g., "green" for normal operation, "red" indicating a failure) as well as provide other metrics (e.g., information relating to the functionality provided by the resources). For example, a storage component might include a display showing how much data the resources has stored in a data store. In some examples, the indication might be some type of indication other than visual (e.g., auditory or haptic).

In some configurations, the user may change the configuration of the physical model during a time the infrastructure is instantiated within the network(s). For example, a user may decide to add another resource to the model (e.g., add a component to the model). In response to detecting the change, updated infrastructure data is provided to the configuration service that may be used to update the provisioning of infrastructure in the network. Additional details regarding the various components and processes described above for using a model to define an infrastructure of an application used in a service provider network will be presented below with regard to FIGS. 1-11.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the technologies described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a physical model may be used to define an infrastructure of an application that may be provisioned in a network. As illustrated, the operating environment 100 includes a customer computing device 140, a configuration environment 124, an execution environment 166A and 166B, and resources 130A and 130B (which may be referred to herein as "resources 130"). In some examples, the computing devices are configured to operate in a service provider network 120 and/or in the network 121.

As described in more detail below, the service provider network 120, and possibly the network 121, may include a collection of rapidly provisioned and, potentially, released computing resources hosted in an execution environment 166A or 166B. Customers of the service provider network 120 may purchase and utilize computing resources 130, such as virtual machine instance 172, networking resources 178, storage resources 174, or other types of computing resources, from a service provider on a permanent or as-needed basis. The computing resources 130A may include a number of computing, networking and storage devices in communication with one another. In some configurations, the computing resources 130A may correspond to physical computing devices, such as the servers 170A-170N. In other configurations, the computing resources may correspond to virtual machine instances, such as the virtual machine instances 172, implemented by one or more physical computing devices, such as the servers 170A-170N.

According to some configurations, the network 121 may be similarly configured to the service provider network 120. For example, the network 121 may have an execution environment 166B and the resources 130B. The resources 130B may be the same or different from the resources 130A. In some examples, the network 121 may be programmatically accessed by the configuration environment 124 and/or the execution environment 166B. For example, the configuration service 144 may configure the resources 130B in the network 121 by sending data (e.g., commands) to one or more computing resources operating in the network 121.

Each type or configuration of a computing resource may be available from the service provider that operates the service provider network 120 in different sizes. For example, a service provider might offer virtual machine instances 172 or other types of data processing resources that are available for purchase and use that have many different configurations of processor capabilities, main memory, disk storage, and operating system. A service provider might also offer other types of resources 130 for purchase and use by customers. For example, a service provider might offer file or block data storage resources 174, database resources 176, networking resources 178, such as load balancing resources, domain name service ("DNS") resources, virtual networking resources, security resources 180 and/or other types of resources 182 on a permanent or as-needed basis.

The service provider operating the service provider network 120 might also charge a fee for operating the resources 130 that the customer creates and uses within the service provider network 120. The fee charged for a particular resource 130 might be based upon the type and/or configuration of the resource 130. The fee charged for a particular resource 104 might also be based upon the amount of time the resource 130 is utilized. For example, in the case of a data processing resource, like a virtual machine instance 172, the fee for use of the resource might be charged based upon the amount of time the resource is utilized. In the case of a data storage resource 174, the fee might be computed based upon the amount of data stored and/or the amount of data transferred into or out of the resource. The fees for other types of resources 130 might also be based upon other considerations. A service provider might also utilize various purchasing models to determine the amount to charge a customer for use of resources 130 provided by the service provider.

The various resources 130 described above might also be provisioned and de-provisioned as needed in an automated fashion. For example, a customer might submit a request to the service provider network 120 to instantiate a new instance of a computing resource 130, such as an instance of a virtual machine. In response to receiving such a request, a provisioning manager 122, or one or more other components within the service provider network 120, might create the new instance of the virtual machine as requested by the customer. The customer may then be permitted to utilize the new instance of the virtual machine as desired. Other types of computing resources might be instantiated in a similar fashion.

When a customer has finished using a computing resource 130, such as a virtual machine instance 172, the customer may request that the resource 130 be de-provisioned. In response thereto, the provisioning manager 122, or another component in the service provider network 120, may cause the computing resources 130 to be de-provisioned. Other types of computing resources 130 might also be provisioned and de-provisioned in a similar manner. The service provider network 120 might also provide functionality for automatically scaling and/or de-scaling resources 130 based upon demand for the computing resources 130 or other factors.

As mentioned above, it might be difficult for the customer of a service provider network to define the infrastructure that defines the resources 130 used by an application that executes within the service provider network 120 and/or in the network 121, and possibly other networks (not shown). For instance, in the example shown in FIG. 2, a customer might be interested in creating an application that includes computing resources, such as web servers that auto-scale, a load-balancer, a firewall, and a data storage service. Manually defining the infrastructure that may be used in provisioning the resources in the service provider network 120, however, may be time consuming and error-prone for some customers. As used herein, the terms "customer" and "customers" refer to existing customers of the service provider network 120 as well as visitors (i.e. potential customers) to the service provider network 120 that are authorized to execute a virtual machine instance 172 (e.g., the instances 172A-172N) in the service provider network 120.

In order to assist a customer of the service provider network 120 in defining the infrastructure, the customer may create a physical model 150 of a desired infrastructure. As discussed briefly above, the model 150 includes one or more components 151 that are arranged to represent the desired infrastructure. For example, the user might build a model 150 using blocks of different colors and/or shapes to represent different resources 130. In other examples, the user may assemble a model 150 using smart components. In some examples, the model 150 might include physical components 151 that represent any resource 130 available from or within the service provider network 120, within the network 121, and possibly within other networks. The physical model 150 may also include the connections, such as network connections, between the resources as well as other data that includes additional details that are associated with one or more of the resources 130.

The connections might be determined by the model or by some other computing device. For example, smart components 151 may identify when a component is connected to another component (e.g., snapped together, a connector connecting the components together on a breadboard, or a relationship between the components). In some examples, an imaging device, such as a camera 164 may capture one or more images 153 of the model 150 that may be analyzed and used to generate infrastructure data 152. In some configurations, the infrastructure data 152 includes data identifying the resources 130 of the model 150 and the connections between the resources 130.

In some examples, the model 150 may provide infrastructure data 152 to the configuration service 144 that is part of, or is associated with, the service provider network 120. According to some configurations, the configuration service 144 may receive the infrastructure data 152 or the images 153 of the model 150 from the customer computing device 140.

After receiving the infrastructure data 152 or the image 153, the provisioning manager 122 may analyze the infrastructure data 152, to identify the specific resources 130 as well as how the resources are connected within the physical model 150. For example, the provisioning manager 122 may analyze the infrastructure data 152 to identify an occurrence of one or more physical components 151 in the physical model 150 and the connections between the resources 130 represented by the model 150.

According to some configurations, mappings between the physical model and the associated resource 130 may be stored and defined in the mappings 116 illustrated in the data store 162A and/or in the data store 162B. The mappings 116 might map any graphical shape, text, icon or some other type of graphical indicator to one or more resources 130 of the service provider network 120 and/or the network 121. For example, the mappings 116 might map a red 4×2 block to one resource 130 and map a green 4×2 block to another type of resource 130.

In other examples, the customer might supply all or a portion of the mappings 116. For example, the customer might define mappings 116 that modify previously defined mappings 116 (e.g., the mappings provided by the owner/operator of the service provider network 120 or the network 121). The mappings 116 specified by the customer might also be new mappings 116 that have not been defined (e.g. new or different components to represent the available resources 130). The mappings 116 might also include mappings for text, symbols, or other graphical elements that are used to specify parameters for the resources 130. For example, one symbol might indicate that a data store may be read, whereas another symbol might indicate that a data store may be read/write.

In some examples, an operator of the service provider network 120 might supply the customer with the physical components 151 (e.g., a set of blocks or a breadboard with physical components) that might be placed in a model to represent the different resources 130A available from the service provider network 120. Similarly, the network 121 might provide a customer with the physical components 151 that might be placed in the physical model 150 to represent the different resources 130B available from the network 121.

The provisioning manager 122 may also analyze the image 153 to detect additional details relating to the infrastructure represented by the model 150. For example, a customer might associate tags (e.g., graphical or text) with a component 151 that may be used to further define the associated resource 130. In some examples, a tag may specify a value of a parameter that is associated with the resource (e.g., instance type, security permissions, allowed ports). For instance, a sticker (or writing) could be placed on a component 151 that identifies a size of the instance (e.g., "medium" to indicate a four core processor using 15 GB of memory, "small" to indicate a two core processor using 1.5 GB of memory). Further examples are provided below with regard to FIGS. 2-4.

In some configurations, after analyzing the infrastructure data 152 and/or the image 153, the provisioning manager 122, or some other component, may query the customer for parameters that might be needed before the infrastructure may be provisioned and launched within the service provider network 120 and/or in the network 121. For example, the user interface 145 may be used to obtain the requested parameter data. In some examples, the user may be prompted to supply parameters that may not have been determined from the infrastructure represented by the model 150. The parameters that might be requested typically depend on the type of resource 130 that are identified from the physical model 150. For example, when the resource is a security group, the parameters generally relate to security settings. When the resource is a virtual machine instance, the parameters may relate to the type of the virtual machine instance.

Figure 2:
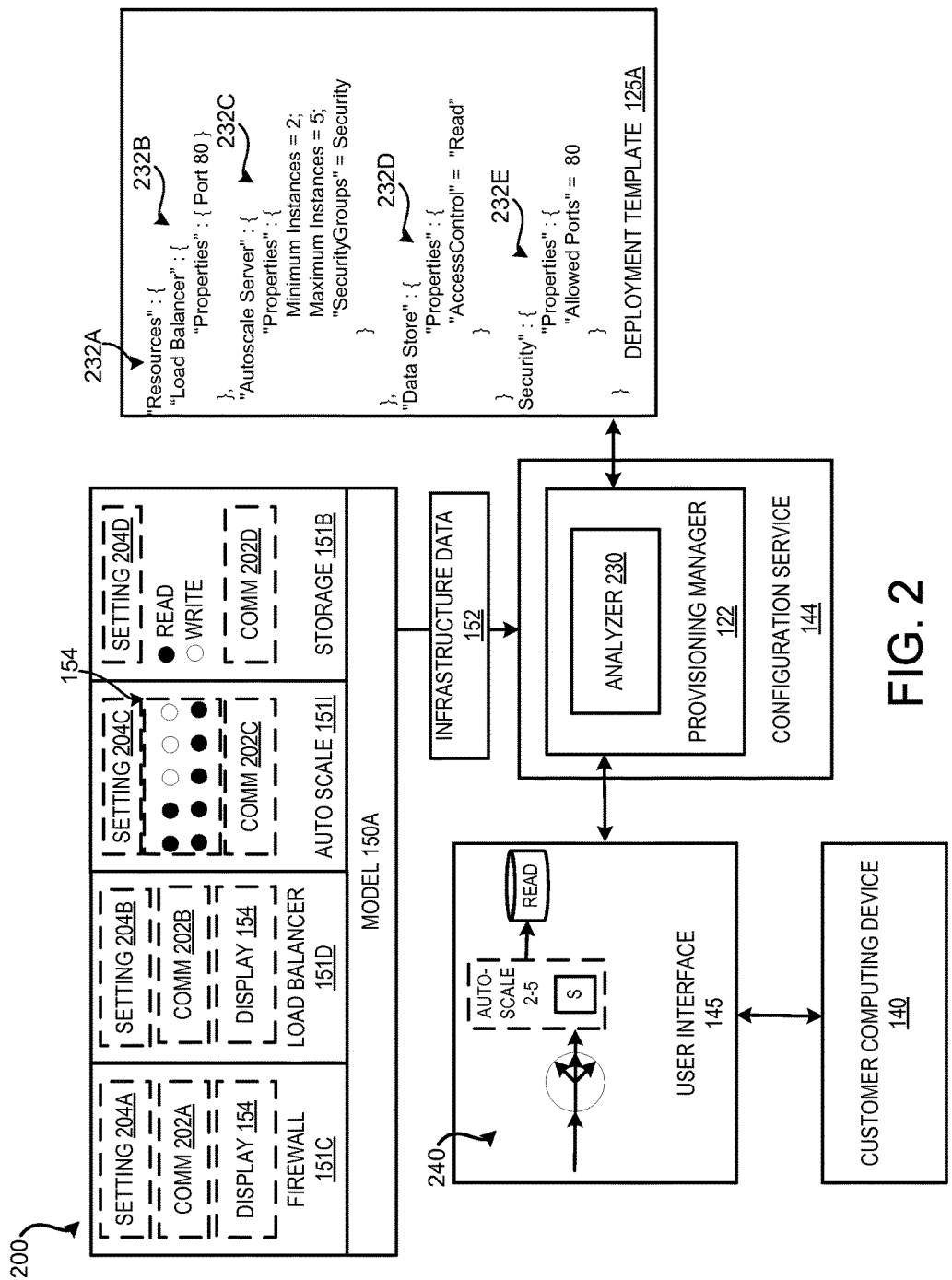
FIG. 2 is a block diagram depicting an illustrative operating environment in which a physical model of an infrastructure is used to generate a deployment template.

The provisioning manager 122 may also analyze the infrastructure data 152 and/or the image 153 to determine the network connections ("connections") between the resources. For example, the connections might be indicated by an arrangement of the components 151 in the model 150, the connection of the components 151, and the like. In some configurations, the connections connect different networks. For example, a connection in the model 150 might connect one or more resources 130A provided by the service provider network 120 with one or more resources 130B provided by the network 121. After identifying the resources 130 and the connections between the resources 130, the provisioning manager 122 may generate configuration data 114 that describes a configuration of the infrastructure of the application within the service provider network 120 and/or other networks. FIG. 2 illustrates an example of an infrastructure depicted in a physical model.

In some examples, the configuration data 114 may be used by the provisioning manager 122, the deployment component 126, or some other computing device, to generate a deployment template 125. The deployment template 125 might be implemented utilizing JavaScript Object Notation ("JSON") language, a text file, or some other suitable language. In some configurations, the deployment component 126, or another component in the service provider network 120, may utilize the deployment template 125 to provision the identified resources. In some configurations, the identified resources may be provisioned in the service provider network 120, the network 121 and possibly other networks.

The deployment template 125 might also be provided to the customer. For example, the deployment template 125 may be provided to the customer for modification before the deployment template is used to provision the service provider network 120 and/or the network 121. An example of a deployment template 125 is illustrated in FIG. 2. The customer might also share the deployment template 125 with other users.

Once the configuration data 114 describing the configuration of the infrastructure has been generated, and/or the deployment template 125 has been generated, portions of the configuration data 114 or the deployment template 125 might also be included in an appropriate interface, such as the UI 145, through which the customer, or some other authorized user, can modify the data. In particular, the UI 145 might present the resources, parameters for the resources and the connections between the resources for the infrastructure determined from the model 150.

The UI 145 might also provide functionality for allowing a customer to enter parameters that were not included in the model 150, or not identified correctly, for one or more resources 130 that were identified from the model 150. A customer might also be permitted to utilize the UI 145 or other type of interface provided by the provisioning manager 122 to change and/or specify other parameters or resources.

In some examples, the deployment template 125 is generated once the customer has completed modifications to the configuration data 114, if any, using the configuration data 114. For example, and without limitation, the deployment template 125 might specify resources, parameters associated with the resources, and the like.

As briefly discussed above, a component within the service provider network 120, such as a deployment component 126, may utilize the deployment template 125 to provision and instantiate the defined resources 130 in the service provider network 120. Alternately, the deployment component 126 might utilize the configuration data 114 directly to instantiate the defined resources 130 in the service provider network 120. In some examples, the infrastructure is provisioned within the network(s).

After instantiation of the infrastructure within the network(s), the model 150 may provide an indication of how the resources 130 identified by the model are operating. For instance, smart components may include a display 154 indicating the status of the resources (e.g., "green" for normal operation, "red" indicating a failure) as well as provide other metrics (e.g., information relating to the functionality provided by the resources). For example, a storage component might include a display showing how much data the resources has stored in a data store. As briefly discussed above, the indication of the how the resources 130 are operating might be provided using some other mechanism in addition to, or as an alternative to a visual indication. For example, the indication might be an auditory indication (e.g., a sound or speech) or a haptic indication (e.g., vibration). According to some configurations, the configuration service 144 monitors the resources 130 in the execution environment (e.g., execution environment 166A and/or 166B). The configuration service 144 might provide (e.g., transmit over a wireless link) operating data 155 to the model 150. As discussed above, the operating data 155 may include data relating to the current state or operation of one or more resources within the execution environment. In other configurations, the execution environment (e.g., execution environment 166A and/or 166B) may send the operating data 155 to the model 150. The components 151 may update the display 154, or provide some other indication, after receiving the operating data 155.

Figure 4:
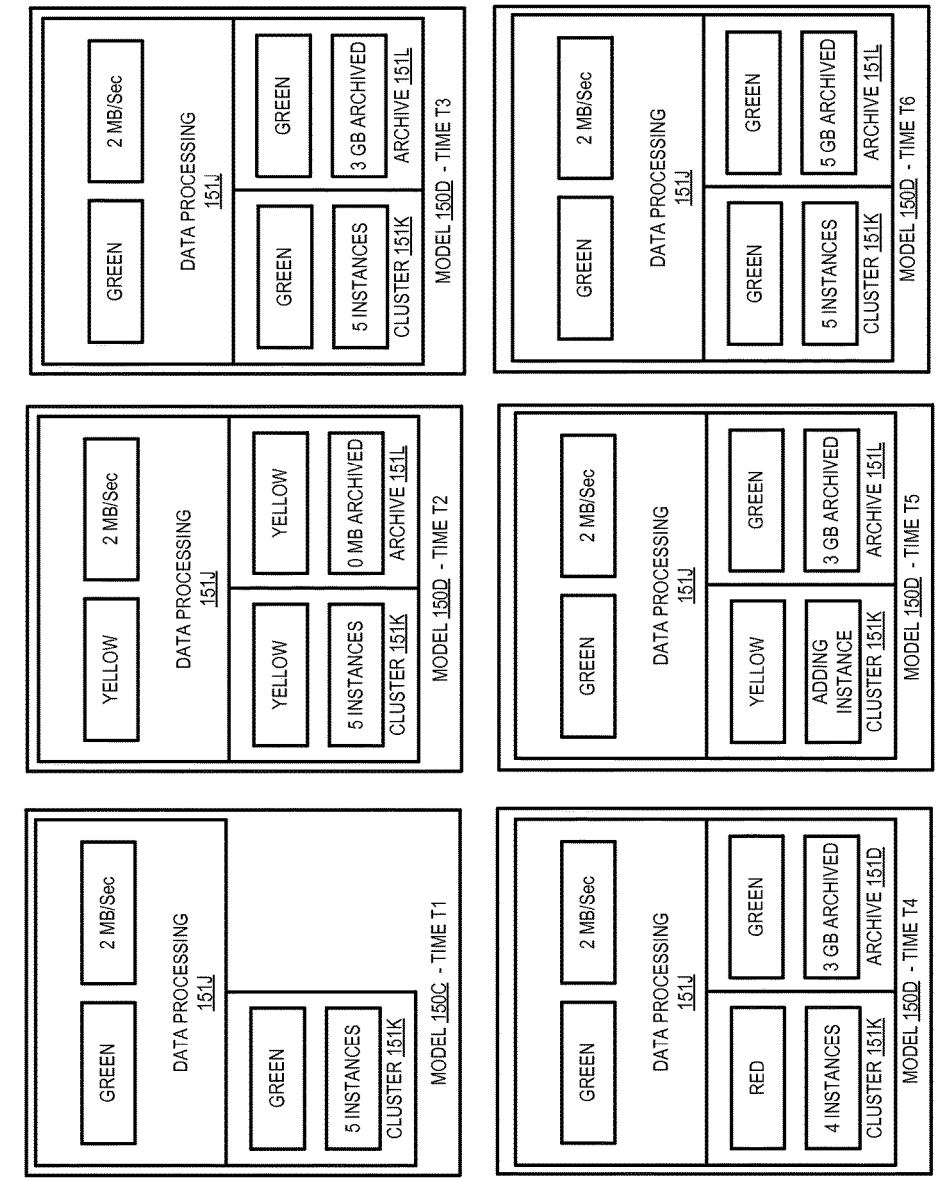
FIG. 4 is a block diagram depicting an illustrative operating environment in which a physical model changes over time.

In some configurations, the user may change the model 150 during a time the infrastructure is instantiated within the network(s). FIG. 4 illustrates an example of adding a component to a model 150. For example, a user may decide to add another resource to the model. In response to detecting the change, updated infrastructure data is provided to the configuration service that may be used to update the infrastructure. More details regarding using a model 150 to define an infrastructure are provided below.

FIG. 2 is a block diagram depicting an illustrative operating environment 200 in which a model 150A of an infrastructure is used to generate a deployment template 125A. The operating environment 200 is similar to the operating environment 100. As illustrated, the environment 200 shows the configuration service 144, the customer computing device 140, the user interface 145, the model 150A and the deployment template 125A.

The example shown in FIG. 2 is intended to be illustrative, and is not intended to be limiting. As illustrated, a user (e.g., a customer of the service provider network 120) created the model 150A to represent a desired infrastructure. As depicted in the illustrative example, the model 150A illustrates an infrastructure that includes a firewall component 151C that is connected to a load-balancer component 151D. The load-balancer component 151D is connected to an auto-scaling group of servers ("auto-scaling group 151I component") that is connected to the storage component 151B. In some configurations, the physical components 151 that are used to assemble the model 150A may be configured to include various types of functionality. For example, the physical components 151 might include a communication component, such as comm 202A-202D, that may be used by the model 150A to communicate the infrastructure data 152 to the provisioning manager 122 in the configuration service 144. The components 151 might also include a display 154 that may be used by the components 151 of the model 150A to display information relating to the infrastructure. The components 151 might also include hardware button(s), such as setting 204A-204D, for configuring parameters relating to associated resource 130.

In some configurations, the components 151 may be associated with default settings. For example, the firewall component 151C of the model 150A may include a default setting that specifies to allow traffic using port 80. In other examples, the setting 204A might be used to set the allowed ports and/or other settings. In yet other examples, the user might write or attach some other graphical indicator on the firewall component 151C to specify a parameter. As illustrated, the firewall component 151C is placed before the load-balancer component 151D.

The auto-scaling group 151I is set (e.g., using setting 204C) to set two servers as the minimum number of servers as indicated by the two black circles in the top line of circles in the display 154. The maximum number of servers is set to five (e.g., using setting 204C, as illustrated by the five black circles in the second line of the display 154. In the current example, the auto-scale component 151I includes circle indicators. In other example, the display 154 might include text or other graphical elements. The components 151 might also include other types of notification elements, such as sound (e.g., buzzers), or visual components to notify the occurrence of various events. For example, a sound could activate on when a resource is being provisioned and another sound could activate in response to some other event (e.g., a server is added during an auto-scale event), and the like. In the current example, the storage component 151B is set (e.g. using setting 204D) to indicate that data may be read from a storage resource.

As discussed above, after the model 150A is assembled, the infrastructure data 152 may be generated (e.g., by one or more of the smart components of the model 150A and/or by another computing device). In other examples, the infrastructure data 152 is generated as the model 150A is being assembled. After receiving the infrastructure data 152 at the configuration service 144, the provisioning manager 122 may analyze the infrastructure data 152 to identify the defined infrastructure. In some examples, the provisioning manager 122 utilizes an analyzer 230 that is configured to identify the resources 130 and connections represented by the model 150A.

In some configurations, the analyzer 230 may also be configured to perform image analysis on an image 153 of the model 150. For example, the analyzer 230 may be configured to perform optical character recognition on the image 153 of the model 150 to identify text elements. In some examples, the text elements may identify the resources 130. In other examples, the text elements may identify and/or define one or more parameters that are associated with one or more of the depicted resources 130. For example, a user might have written "port 80" on a writing area (not shown) of the firewall component 151C. The text may be captured by an image capture device (e.g., camera 164), identified by the analyzer 230 and associated with the firewall resource associated with the firewall component 151C.

After identifying the resources 130, and the connections between the resources 130, the provisioning manager 122 may generate the configuration data 114 and/or create the deployment template 125A. As discussed above, a deployment template, such as the deployment template 125A, may define the infrastructure of an application in a service provider network 120 and/or within other networks. In the current example, the deployment template 125A includes data describing the configuration of the resources 130 represented by the model 150 that is to be created in one or more networks. The illustrated deployment template 125A is simplified for purposes of explanation. For example, the deployment template 125A may include other data, such as parameters that define attributes of the resource, mappings that are used to identify items in the template, outputs that might be provided to the customer, or the like. The resources 130 might also include more or fewer properties.

As illustrated, the deployment template 125A includes a resources section 232A that includes a load balancer section 232B, an auto-scale server section 232C, a data store section 232D and a security section 232E. The provisioning manager 122 may identify the resources 130 using the model 150A to create each of the sections 232A-232E contained in the deployment template 125A. In other examples, the provisioning manager 122 may include more information in the deployment template 125A that might not be depicted in the model 150A. For example, the provisioning manager 122 might include one or more resources 130 that are needed in order to deploy the infrastructure represented by the model 150A.

After creating the deployment template 125A, the user might use the user interface 145 to interact with the configuration data 114 that is associated with the deployment template 125A. In some examples, a graphical illustration 240 might be created from the deployment template and shown to the user in the user interface 145. The user might view the graphical illustration 240 to determine whether the provisioning manager 122 analyzed the infrastructure data 152 associated with the model 150A correctly. As discussed above, the user interface 145 might also be used to change parameters associated with the resources 130, add/delete resources, and the like.

The deployment template 125A might be defined such that the provisioning manager 122 or some other component (e.g., the deployment component 126) may use the deployment template 125A to provision the depicted resources 130 in the service provider network 102 and/or instantiate the infrastructure in the service provider network 120.

Figure 3:
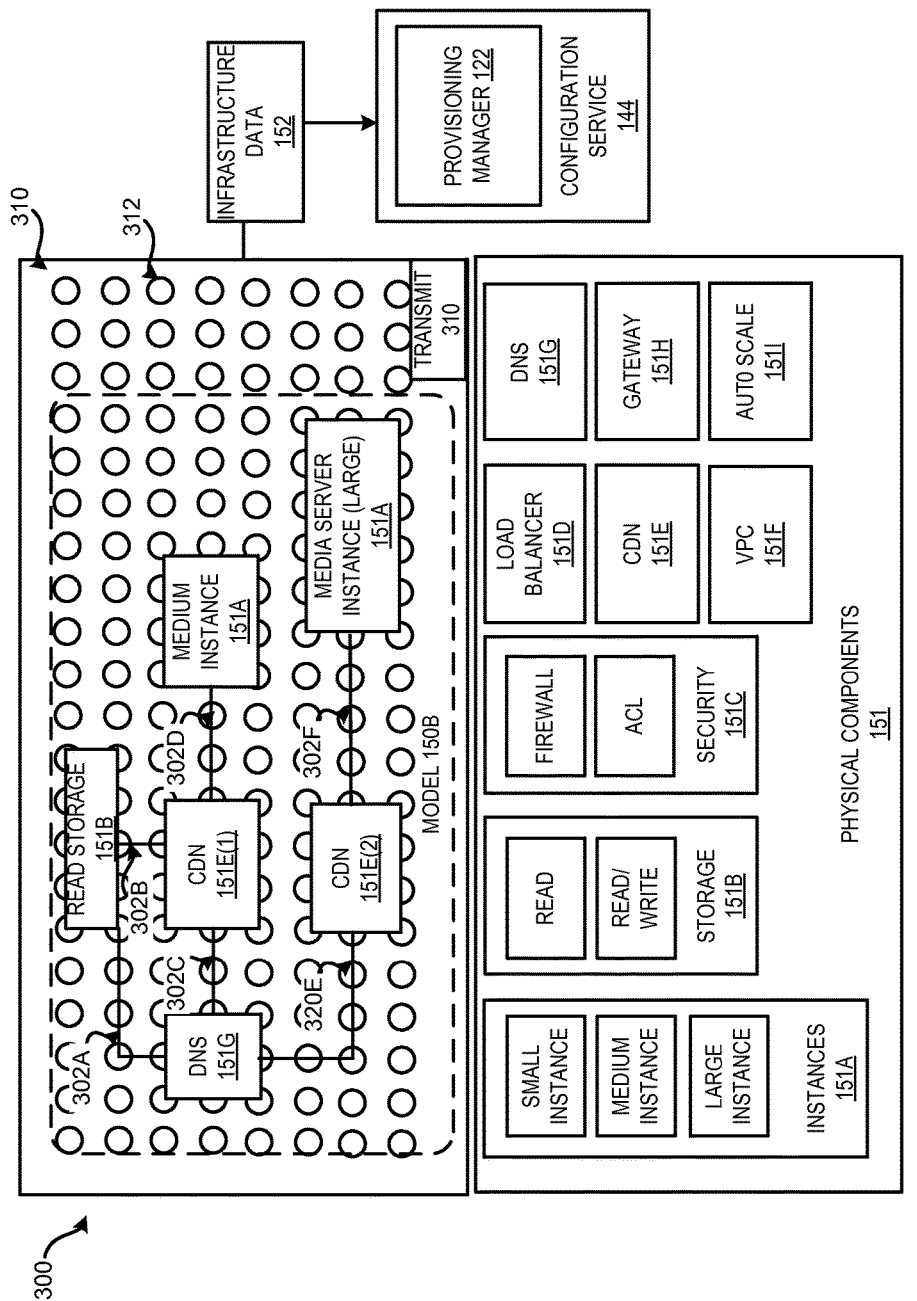
FIG. 3 is a block diagram depicting an illustrative operating environment in which a physical model of an infrastructure may be used to provision a network.

FIG. 3 is a block diagram depicting an illustrative operating environment 300 in which a model 150B of an infrastructure may be used to provision a network. The operating environment 300 is similar to the operating environment 100. As illustrated, the environment 300 shows the configuration service 144, physical components 151, and the model 150B.

As illustrated, a user created the model 150B to represent a desired infrastructure. As depicted in the illustrative example, the model 150A includes an infrastructure that might be used for a content and media service. According to some configurations, the user may select from different physical components 151 when assembling the model 150B. As discussed above, the physical components 151 might be blocks that may be placed onto a breadboard 310. The breadboard 310 might be any size breadboard that includes a desired number of connection points. In some examples, a model might be spread across more than one breadboard. For example, one breadboard might be used for resources 130 provided by one network and another breadboard used for resources 130 provided by another network.

In some configurations, different physical components 151 are associated with different resources 130 that may be provided by a network. In the current example, only a portion of the provided resources 130 of a network are depicted in the physical components 151. As illustrated, the physical components 151 include instances 151A (e.g., small sized instance, medium sized instance, large sized instance), storage components 151B, security components 151C (e.g., firewall, access control list), load-balancer component 151D, content delivery network ("CDN") component 151E, domain name system ("DNS") component 151G, gateway component 151H, virtual private cloud ("VPC") component 151F and auto scale group component 151I. As discussed above, a physical component might represent a single resource type and size and/or be configured to represent a particular type of resource (e.g., by setting an option on the physical component).

According to the current illustration depicted in FIG. 3, the user has selected a DNS component 151G, a storage component 151B, two CDN components 151E(1) and 151E (2), a medium instance component 151A and a large instance component 151A that represents a media server. The components 151 might be connected using connectors 302A-302F. In other examples, the components 151 might be connected based on a proximity of the components relative to each other. The CDN components 151E(1) and 151E(2) may be configured to speed up distribution of static and dynamic web content by delivering content through a worldwide network of data centers called edge locations.

When a user requests content that is associated with a CDN component, such as the CDN components 151E(1) or 151E(2), the user may be routed to the edge location that provides the lowest latency (time delay). If the content is already in edge location with the lowest latency, the CDN may deliver the content immediately. If the content is not currently in that edge location, the CDN may retrieves the content from storage, such as a storage component 151B that is identified as the source for the content. The DNS 151G may be configured to answer DNS queries.

According to some configurations, the DNS 151G may be configured to use a global network of DNS servers. While not included in the model 150B, a VPC component 151F may be configured to provide a virtual network. A VPC may be logically isolated from other virtual networks. A user might use a VPC component 151F to launch resources 130, such as instances 151A.

According to some configurations, when the user is satisfied with the model 150B, the user may select the transmit option 310 on the breadboard to transmit the infrastructure data 152 for the model 150B to the configuration service 144. For example, in response to receiving a selection of the transmit option 310, the breadboard 310 may identify the physical components 151 placed on the breadboard 310, determine the connections between the physical components 151 and transmit (e.g. wired/wirelessly) to the configuration service 144. As discussed above, the configuration service 144 may generate the configuration data 114 and provision the identified resources within one or more networks.

FIG. 4 is a block diagram depicting an illustrative operating environment 400 in which a model 150C changes over time. The operating environment 400 may be similar to the operating environment 100. As illustrated, a user at time T1 created the model 150C to represent a desired infrastructure. The model 150C includes two physical components 151 (e.g., two smart components that snap together). A data processing component 151J is connected to a cluster component 151K. The model 150D adds an archive component 151L to the model 150C.

The data processing component 151J may be a resource 130 provided by a network that performs data processing in real-time. For example, the data processing performed by the data processing component 151J might be configured to process streaming data. The cluster component 151K may be another resource 130 provided by the network that may create a cluster of instances to process data. The archive component 151L may be another resource 130 that performs data archiving.

In the current example, each of the components 151 is a smart component that may communicate with other components 151 as well as the configuration service 144. As illustrated, the data processing component 151J, the cluster component 151K and the archive component 151L include a status indicator (e.g., green, yellow, red) and a display that provides information relating to the operation of the component 151.

As discussed above, after assembling the model 150C, the infrastructure may be provisioned in one or more networks and begin to operate. At time T1, the model 150C is provisioned and is operating properly within the network. While the infrastructure is operating within the network, the user may look at the model 150C to determine a status of various resources 130 that are being utilized. For example, the data processing component 151J at time T1 shows a normal operating status (e.g., the component 151J includes a "green" indicator) and shows that 2 MB/second of data is being processed by the associated data processing resource 130 provided by the network. The cluster component 150C shows a normal operating status (e.g., green) and indicates that the cluster is utilizing five instances.

At time T2, the user adds the archive component 151L to the model 150C creating model 150D. In the current example, the user snaps the archive component 151L to the bottom of the data processing component 151J that is next to the cluster component 151K. As discussed above, when the model 150C changes, the model 150C may send updated infrastructure data 152 to the configuration service 144 that may generate updated configuration data to provision the current resources 130 of the model 150D. During the provisioning, the status of the components 151 may change from a normal operating status to a provisioning status. In the current example, the components 151 change from "green" to "yellow," or some other color/pattern that signifies provisioning.

At time T3, the model 150D has been provisioned and is operating properly within the network. The data processing component 151J at time T1 shows a normal operating status and shows that 2 MB/second of data is being processed. The cluster component 150C shows a normal operating status and indicates that the cluster is utilizing five instances. The archive component 151L shows that 3 GB of data has been archived.

At time T4, the cluster block 151K indicates a failure (e.g., displays "red"). For example, the cluster component 151K may blink red in response to a failure of an instance in the cluster. As can be seen, the number of instances displayed at time T4 on the cluster component 151K is now four instead of five.

At time T5, the cluster component 151K turns yellow as a new instance is provisioned within the network and is added to the cluster. Once the cluster component 151K is healthy, the cluster component 151K turns green again as illustrated at time T6.

FIGS. 5-8 are flow diagrams showing routines that illustrate aspects of using a model of an infrastructure to generate configuration data that may be used to deploy the infrastructure in a service provider network 120, and/or some other network according to an aspect disclosed herein. It should be appreciated that the logical operations described herein with respect to FIGS. 5-8, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Figure 5:
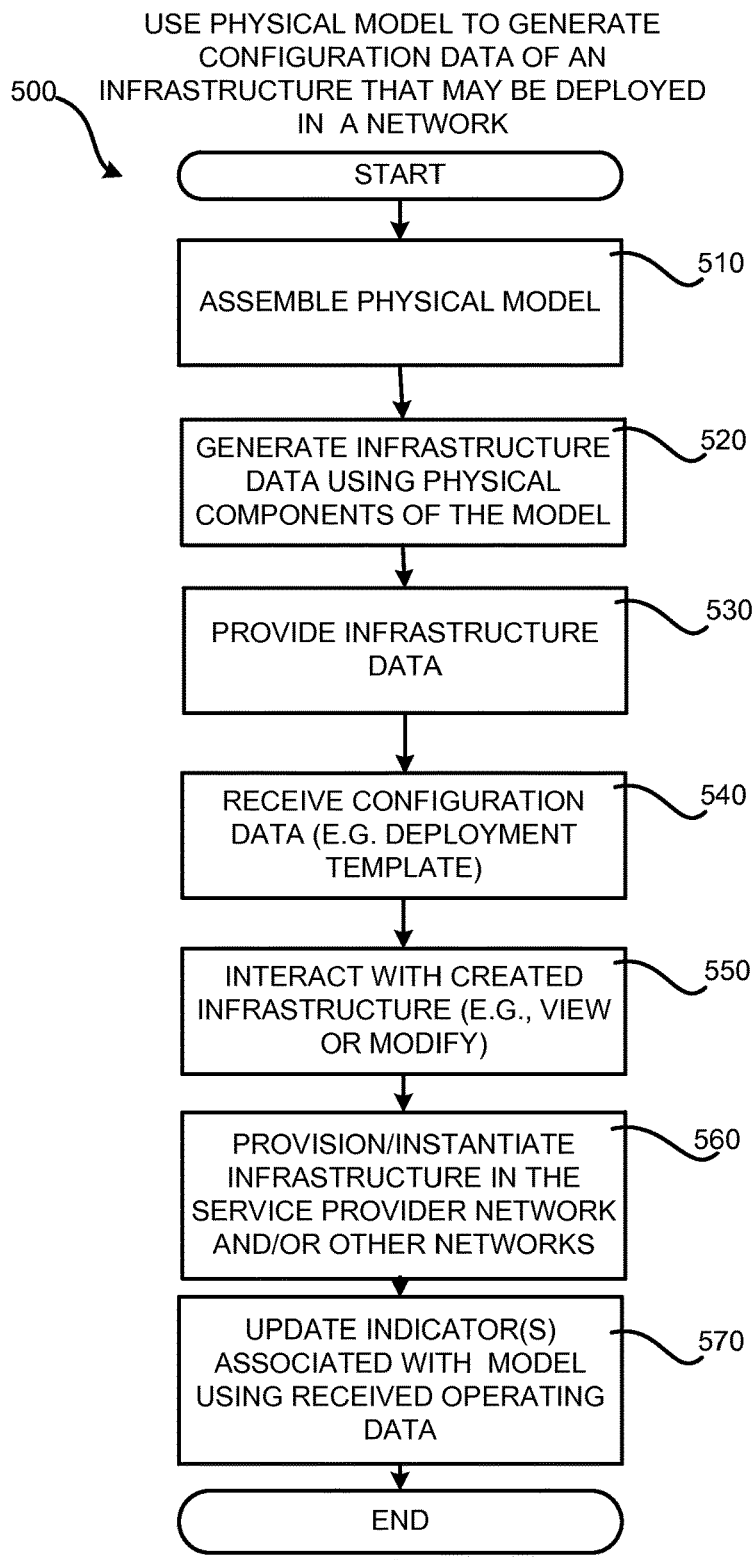
FIG. 5 is a flow diagram showing a routine illustrating aspects of a mechanism disclosed herein for using a physical model to generate configuration data that defines an infrastructure that may be deployed in a service provider network.

FIG. 5 is a flow diagram showing a routine 500 illustrating aspects of a mechanism disclosed herein for using a model 150 to generate configuration data of an infrastructure that may be deployed in a service provider network 120. The routine 500 may begin at operation 510, where the model 150 is created. As discussed above, the model 150 may be built using physical components (e.g., blocks) that represent different resources 130 provided by the network.

From operation 510, the routine 500 may proceed to operation 520, where the infrastructure data 152 may be generated using the physical components 151 of the model 150. As discussed above, the infrastructure data 152 identifies the physical components 151 of the model 150 and determines connections between the physical components 151. In some examples, the model 150 is configured to transmit (e.g. wired/wirelessly) the infrastructure data 152 to the configuration service 144. In other examples, one or more images 153 may be taken by a computing device that are analyzed by the configuration service 144 to generate the infrastructure data 152.

From operation 520, the routine 500 may proceed to operation 530, where the infrastructure data 152 may be provided (e.g., transmitted) to the service provider network 120. As discussed above, the infrastructure data 152 may be provided by the customer computing device 140 to the provisioning manager 122 that is associated with a configuration service 144. The provisioning manager 122 may analyze the infrastructure data 152 to create configuration data 114, and possibly a deployment template 125, that may be launched in the service provider network 120 and/or within another network.

From operation 530, the routine 500 may proceed to operation 540, where all or a portion of the configuration data 114 may be received by the customer using the computing device 140. As discussed above, the configuration data 114 might be used to create the deployment template 125 that is provided by the provisioning manager 122 and received by the customer computing device 140.

From operation 540, the routine 500 may proceed to operation 550, where the customer, or some other authorized user, may interact with data associated with the infrastructure generated using the model 150. As discussed above, the customer might use the user interface 145 to make changes to the definition of the infrastructure. For example, the user interface 145 might be used to set one or more parameters for one or more of the resources 130 that are specified in the deployment template 125 and/or the configuration data. The user interface 145 might also be used to add or remove resources 130 from the determined infrastructure.

From operation 550, the routine 500 may proceed to operation 560, where the infrastructure may be provisioned and/or instantiated in the service provider network 120 and/or within other networks. As discussed above, the infrastructure might be provisioned and/or instantiated in the service provider network 120 and/or other networks using the provisioning manager 122, the deployment component 126, or some other computing device. The deployment component 126 may use the configuration as specified by the deployment template 125 to determine how to provision the resources 130 in the service provider network 120.

From operation 560, the routine 500 may proceed to operation 570, where one or more indicators associated with the model 150 may be updated using received operating data 155. As discussed above, the operating data 155 may be provided to the model 150A by the configuration service 144, an execution environment 166A-166B, or some other service. The operating data 155 may be used by the model 150 to indicate a status of the resources 130 provisioned within the network (e.g., on a display, through a speaker, or through some other haptic device). The routine 500 then proceeds to an end operation.

Figure 6:
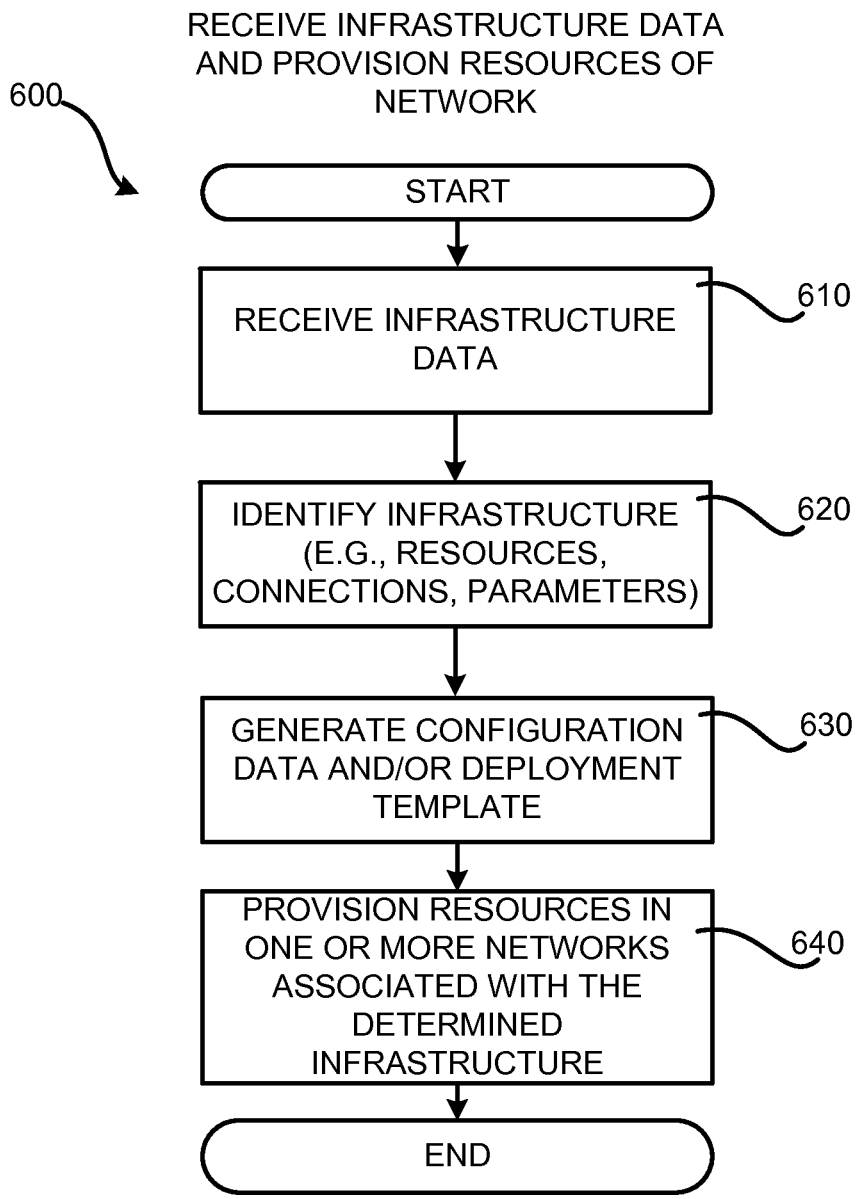
FIG. 6 is a flow diagram showing a routine illustrating aspects of a mechanism disclosed herein for receiving infrastructure data and using the infrastructure data to provision resources of the service provider network.

FIG. 6 is a flow diagram showing a routine 600 illustrating aspects of a mechanism disclosed herein for receiving infrastructure data 152 and using the infrastructure data 152 to provision resources of the service provider network 120. The routine 600 may begin at operation 610, where infrastructure data 152 of a desired infrastructure is received. As discussed above, the infrastructure data 152 may be received from the model 150 or from some other computing device (e.g., the customer computing device 140).

From operation 610, the routine 600 may flow to operation 620, where the infrastructure data 152 is analyzed to identify infrastructure that is represented by the model 150. As discussed above, the provisioning manager 122 might identify the resources 130, parameters that may be associated with the resources 130, and the connections between the resources using the infrastructure data 152 provided by the model 150. In other examples, the provisioning manager 122 may analyze one or more images 153 of the model 150 to determine the resources 130, the connections and parameters associated with the resources 130.

From operation 620, the routine 600 may proceed to operation 630, where the configuration data 114 and/or the deployment template 125 may be generated. As discussed above, the configuration data 114 and/or the deployment template 125 may be generated by the provisioning manager 122, the deployment component 126, or some other computing device.

From operation 630, the routine 600 may proceed to operation 640, where the resources 130 in the service provider network 120 and/or other networks may be provisioned and/or instantiated. As discussed above, the provisioning manager 122, the deployment component 126, or some other component or computing device, may provision and/or instantiate the resources 130 using the configuration data 114 and/or the deployment template 125 generated from the model 150. The routine 600 then proceeds to an end operation.

Figure 7:
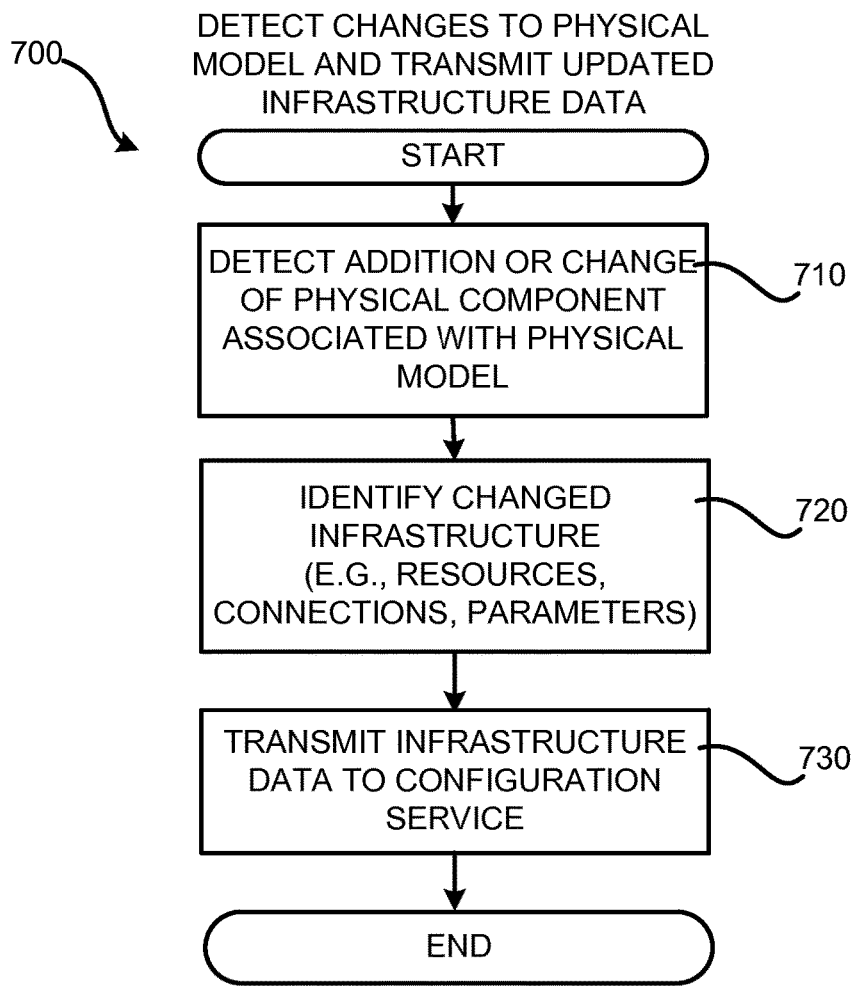
FIG. 7 is a flow diagram showing a routine illustrating aspects of a mechanism disclosed herein for detecting changes to a physical model and transmitting updated infrastructure data.

FIG. 7 is a flow diagram showing a routine 700 illustrating aspects of a mechanism disclosed herein for detecting changes to a physical model and transmitting updated infrastructure data 152. The routine 700 may begin at operation 710, where an addition or change of a physical component 151 of the model 150 is detected. For example, a physical component 151 might be removed from the model 150, a physical component 151 might be added to the model 150, or a physical component 151 of the model 150 might be modified in some manner (e.g., change a setting of the physical component 151). As discussed above, the change to the model 150 might be detected by the model 150 and/or by some other computing device (e.g., taking an image 153 of the model).

From operation 710, the routine 700 may flow to operation 720, where the changed infrastructure is identified. As discussed above, the resources 130, the connections of the resources 130 and values for one or more parameters 130 might be determined by the model 150A, the configuration service 144 or some other computing device.

From operation 720, the routine 700 may proceed to operation 730, where the infrastructure data 152 is transmitted to the configuration service 144. As discussed above, the configuration service 144 may update the infrastructure provisioned in the network based upon the change to the model 150. From operation 730, the routine 700 proceeds to an end operation.

Figure 8:
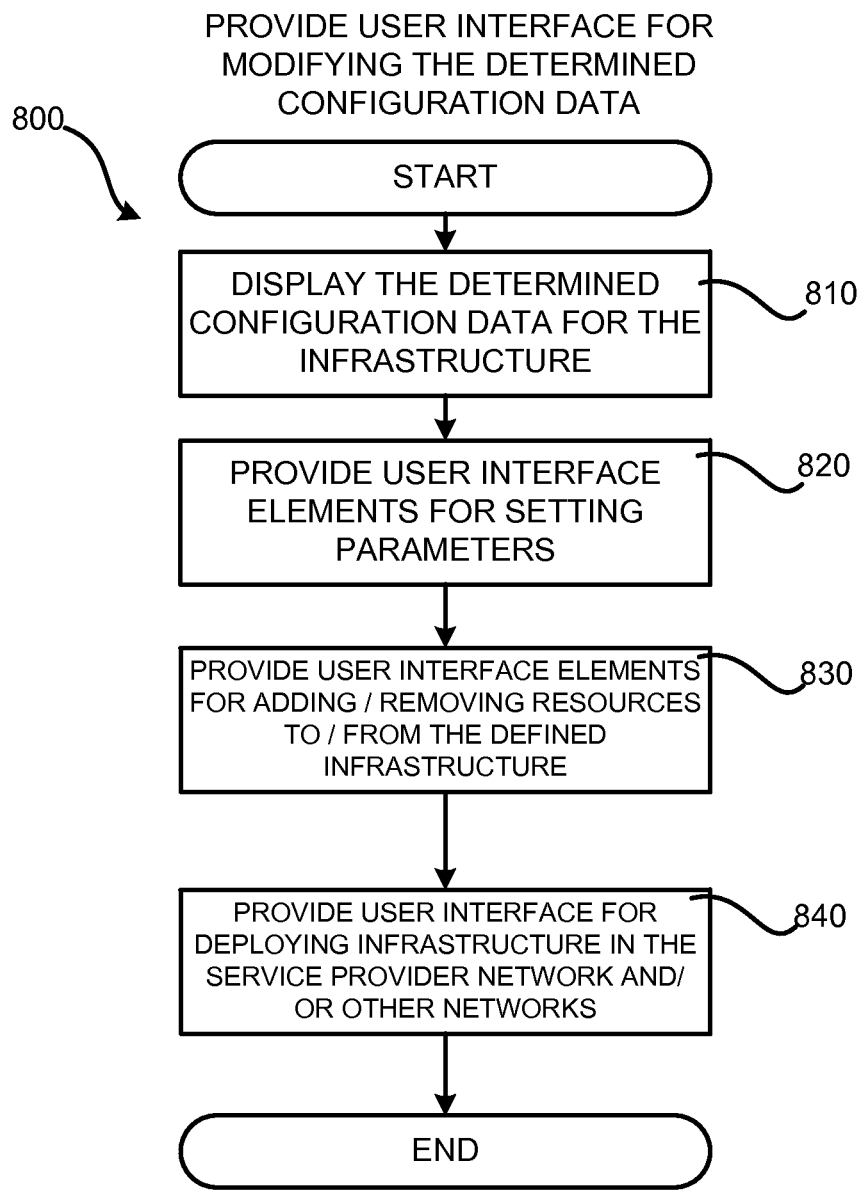
FIG. 8 is a flow diagram showing a routine illustrating aspects of a mechanism disclosed herein for providing a user interface that may be used to interact with configuration data that is associated with infrastructure depicted in a physical model.

FIG. 8 is a flow diagram showing a routine 800 illustrating aspects of a mechanism disclosed herein for providing a user interface that may be used to interact with configuration data 114 that is associated with the infrastructure depicted in the model 150. As mentioned briefly above, although a UI is generally described below, other types of interfaces and/or mechanisms might be provided for allowing a user to view and/or modify the configuration data 114.

The routine 800 may begin at operation 810, where the configuration data 114 for the infrastructure may be displayed. For example, the UI 145 might be presented that displays the resources 130 and the connections between the resources 130 as determined from the infrastructure represented by the model 150. In some examples, the UI 145 might include a graphical illustration 240 that shows a graphical representation of the identified resources and connections between the resources.

From operation 810, the routine 800 may flow to operation 820, where user interface elements may be presented that allows a customer to interact with the configuration data 114 and/or the deployment template 125. In particular, the UI 145 elements might provide functionality for allowing a customer, or some other authorized user, to configure parameters that are associated with the different resources 130 specified by the configuration data 114.

From operation 820, the routine 800 may proceed to operation 830, where UI elements may be provided for allowing a user to add, delete, and/or modify resources 130 in the configuration data 114. For example, the customer might be permitted to add, delete, and/or modify virtual machine instances 172, firewalls, Internet gateways, load balancing devices, and/or other resources 130 in the configuration data 114.

From operation 830, the routine 800 may proceed to operation 840, where a UI 145 element might be provided for allowing a customer to provision and deploy the resources 130 identified in the configuration data 114 in the service provider network 120 and/or other networks. In this regard, it should be appreciated that functionality might be provided for allowing a user to specify other operational aspects not specifically mentioned above. From operation 840, the routine 800 proceeds to an end operation.

Figure 9:
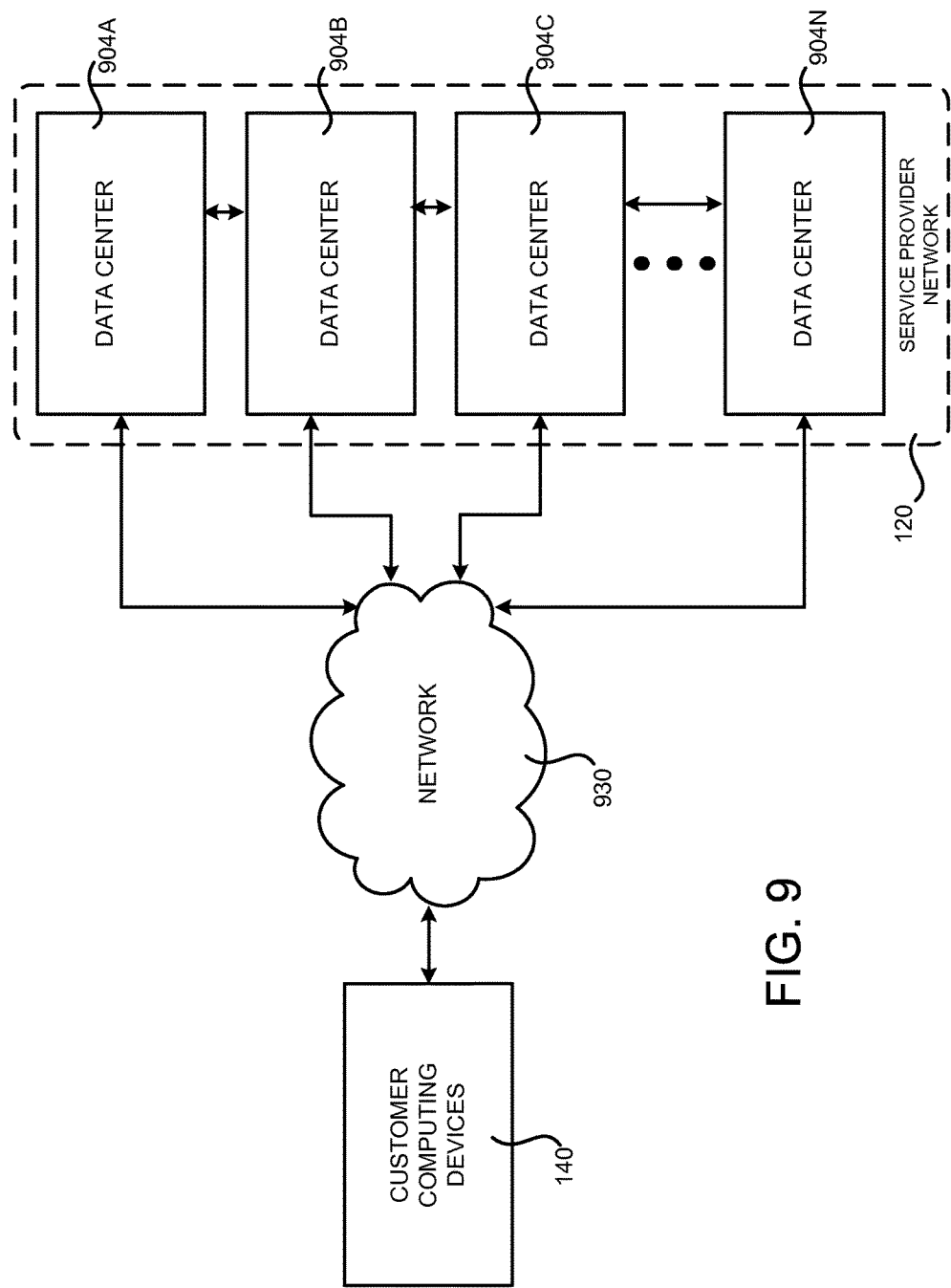
FIG. 9 is a system and network diagram that shows one illustrative operating environment for the technologies disclosed herein that includes a service provider network.

FIG. 9 and the following description are intended to provide a brief, general description of a suitable computing environment in which the technologies described herein may be implemented. In particular, FIG. 9 is a system and network diagram that shows an illustrative operating environment that includes a service provider network 120. As discussed above, the service provider network 120 can provide virtual machine instances 172, other execution environments, and computing resources 130 on a permanent or an as-needed basis.

The computing resources 130 provided by the service provider network 120 may include various types of resources, such as data processing resources, data storage resources, networking resources, data communication resources and the like. Each type of computing resource 130 may be general-purpose or may be available in a number of specific configurations. For example, and as will be described in greater detail below, data processing resources 130 may be available as containers or virtual machine instances 172 in a number of different configurations. The virtual machine instances 172 may be configured to execute applications, including Web servers, application servers, media servers, database servers and other types of applications. Data storage resources 130 may include file storage devices, block storage devices and the like. Each type or configuration of a virtual machine instance of a computing resource 130 may be available in different sizes, such as large resources, consisting of many processors, large amounts of memory, and/or large storage capacity, and small resources consisting of fewer processors, smaller amounts of memory and/or smaller storage capacity.

The computing resources 130 provided by the service provider network 120 are enabled in one implementation by one or more data centers 904A-904N (which may be referred to herein singularly as "a data center 904" or collectively as "the data centers 904"). The data centers 904 are facilities utilized to house and operate computer systems and associated components. The data centers 904 typically include redundant and backup power, communications, cooling and security systems. The data centers 904 might also be located in geographically disparate locations. One illustrative configuration for a data center 904 that implements some or all of the concepts and technologies disclosed herein for providing temporary access to resources in the service provider network 120 will be described below with regard to FIG. 9.

The users and customers of the service provider network 120 may access the computing resources provided by the data centers 904 over a suitable data communications network, such as a Wide Area Network ("WAN"), as illustrated by network 930. Although a WAN might be used, it should be appreciated that a local-area network ("LAN"), the Internet, or any other networking topology known in the art that connects the data centers 904 to the customer computing devices 140 may be utilized. It should also be appreciated that combinations of such networks might also be utilized.

Figure 10:
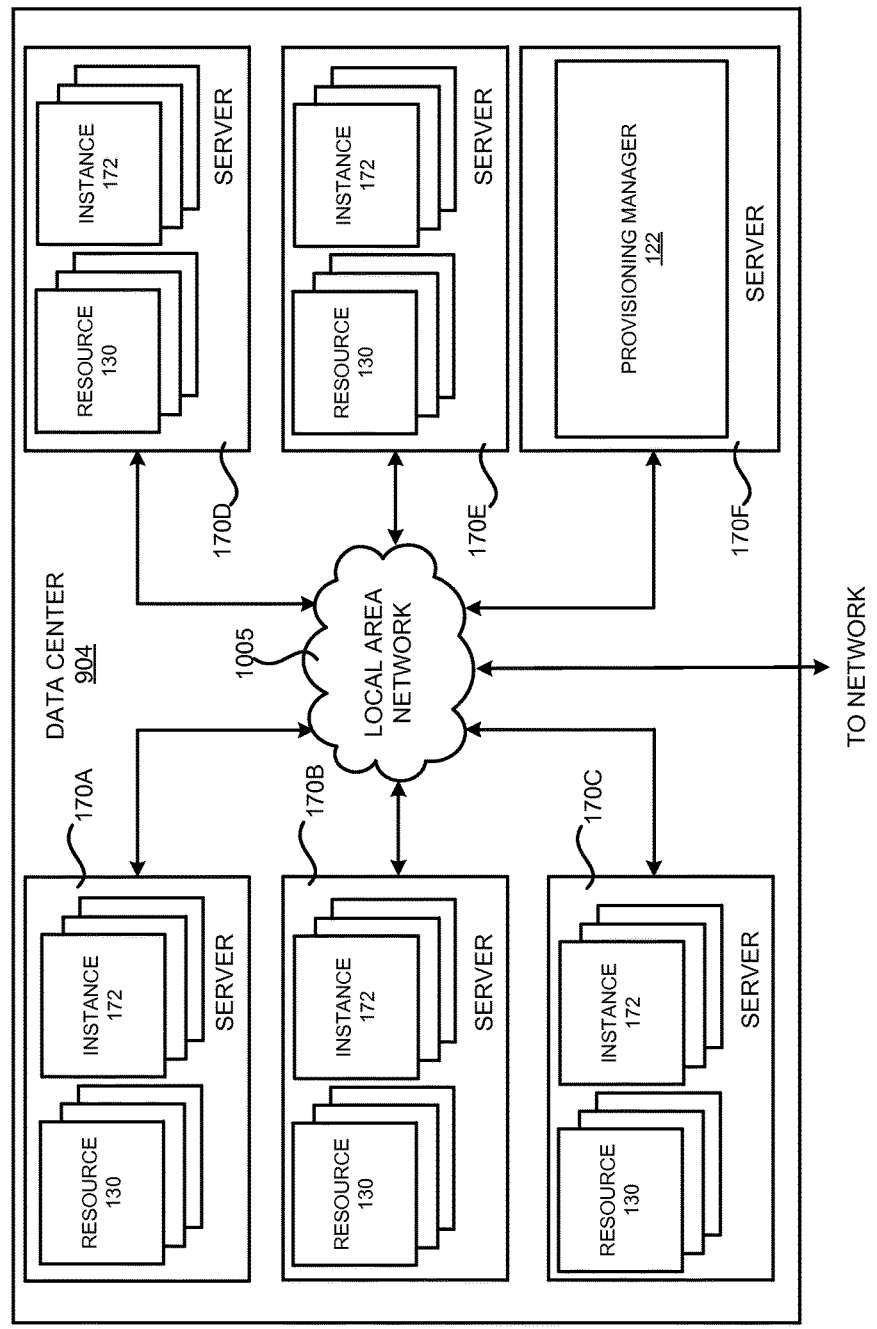
FIG. 10 is a computing system diagram that illustrates one configuration for a data center that implements aspects of a service provider network, including some or all of the concepts and technologies disclosed herein for using a physical model to generate configuration data for an infrastructure.

FIG. 10 is a computing system diagram that illustrates one configuration for a data center 904 that implements aspects of a service provider network 120, including some or all of the concepts and technologies disclosed herein for using model 150 to generate configuration data 114 for an infrastructure. The example data center 904 shown in FIG. 10 includes several computers, such as servers 170A-170F (which may be referred to herein singularly as "a server computer 170" or in the plural as "the server computers 170") for providing computing resources 130. The server computers 170 may be standard tower or rack-mount server computers configured appropriately for providing the computing resources described herein. In one configuration the server computers 170 are configured to execute the software products as described above.

In one configuration, some of the computing resources are the virtual machine instances 172 and the resources 130. As known in the art, a virtual machine instance is an instance of a software implementation of a machine (i.e. a computer) that executes programs like a physical machine. Each of the server computers 170 may be configured to execute an instance manager (not shown) capable of instantiating and managing resources 130 and VM instances 172. In the case of virtual machine instances, for example, the instance manager might be a hypervisor or another type of program configured to enable the execution of multiple virtual machine instances 172 on a single server computer 170, for example.

It should be appreciated that although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 904 shown in FIG. 10 also includes a server computer 170F reserved for executing software components for managing the operation of the data center 904, the server computers 170, virtual machine instances 172, and other resources 130 within the service provider network 120. The server computer 170F might also execute the provisioning manager 122. Details regarding the operation of this component have been provided above. In this regard, it should be appreciated that while these components are illustrated as executing within the service provider network 120, computing systems that are external to the service provider network 120 might also be utilized to execute some or all of these components. Other configurations might also be utilized.

In the example data center 904 shown in FIG. 10, an appropriate local area network ("LAN") 1005 is utilized to interconnect the server computers 170A-170E and the server computer 170F. The LAN 1005 is also connected to the network illustrated in FIG. 10. It should be appreciated that the configuration and network topology illustrated in FIGS.

9 and 10 has been greatly simplified and that many more computing systems, networks and networking devices may be utilized to interconnect the various computing systems disclosed herein. Appropriate load balancing devices or software modules might also be utilized for balancing a load between each of the data centers 904A-904N, between each of the server computers 170A-170F in each data center 904 and between virtual machine instances 172 and other types of computing resources 130 provided by the service provider network 120.

It should be appreciated that the data center 904 described in FIG. 10 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 11:
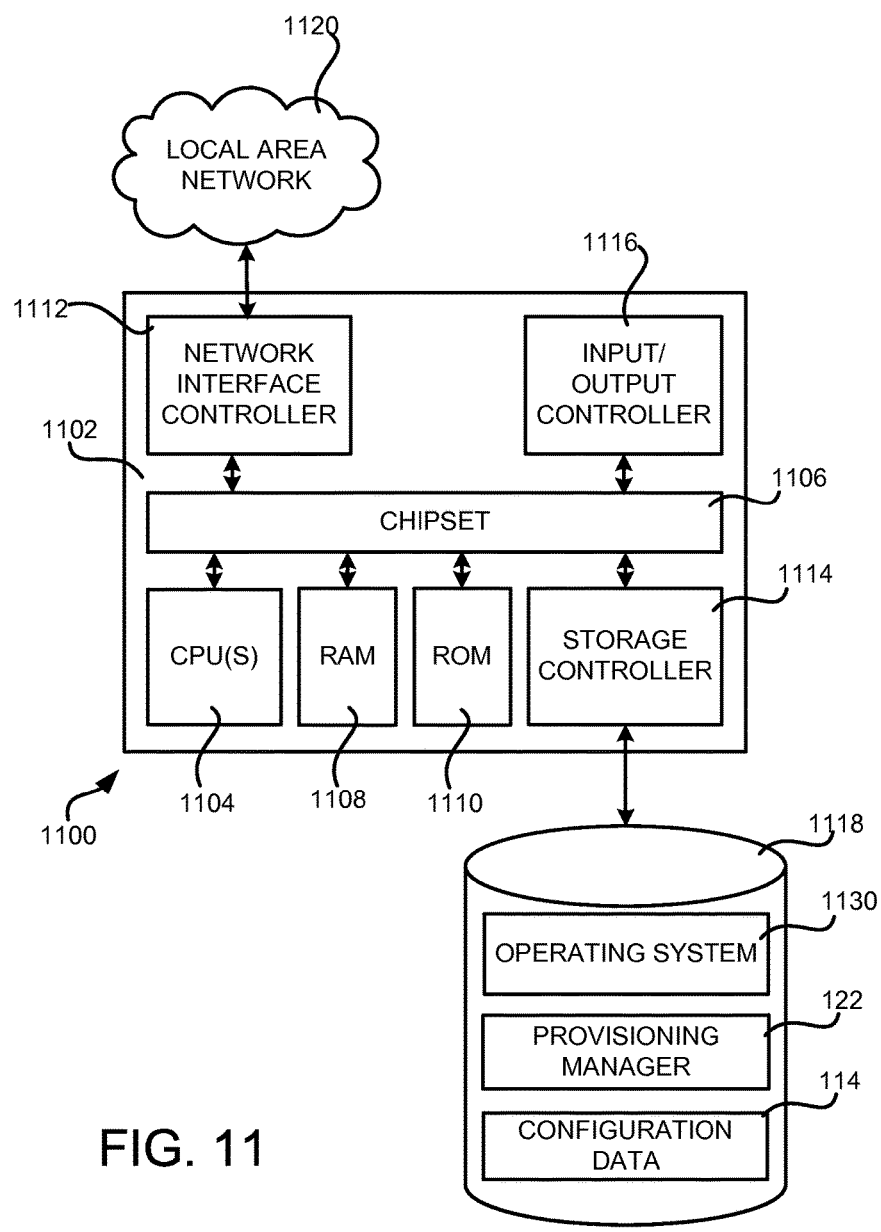
FIG. 11 is a computer architecture diagram showing one illustrative computer hardware architecture for implementing a computing device that might be utilized to implement aspects of the various technologies presented herein.

FIG. 11 shows an example computer architecture for a computer 1100 capable of executing program components for using a model 150 to generate configuration data 114 for an infrastructure in the manner described above. The computer architecture shown in FIG. 11 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 11 may be utilized to execute software components for performing operations as described above. The computer architecture shown in FIG. 11 might also be utilized to implement a customer computing device 140, the server computers 170, the configuration service 144, or any other of the computing systems described herein.

The computer 1100 includes a baseboard 1102, or "motherboard," which is a printed circuit board to which a multitude of components or devices may be connected by way of a system bus or other electrical communication paths. In one illustrative configuration, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1106 provides an interface between the CPUs 1104 and the remainder of the components and devices on the baseboard 1102. The chipset 1106 may provide an interface to a RAM 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100.

The computer 1100 may operate in a networked environment using logical connections to remote computing devices and computer systems through a network, such as the local area network 1120. The chipset 1106 may include functionality for providing network connectivity through a network interface controller ("NIC") 1112, such as a gigabit Ethernet adapter. The NIC 1112 is capable of connecting the computer 1100 to other computing devices over the local area network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD- ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. In one configuration, the operating system comprises the LINUX operating system. In another configuration, the operating system comprises the WINDOWS® SERVER operating system from MICROSOFT Corporation. In other configurations, the operating system may comprise the UNIX operating system. It should be appreciated that other operating systems may also be utilized. The mass storage device 1118 may store other system or application programs and data utilized by the computer 1100, such as components that include the provisioning manager 122, the configuration data 114 and/or any of the other software components and data described above. The mass storage device 1118 might also store other programs and data not specifically identified herein.

In one configuration, the mass storage device 1118 or other computer-readable storage media is encoded with computer-executable instructions which, when loaded into the computer 1100, transform the computer from a general-purpose computing system into a special-purpose computer capable of implementing the technologies described herein. These computer-executable instructions transform the computer 1100 by specifying how the CPUs 1104 transition between states, as described above. In one configuration, the computer 1100 has access to computer-readable storage media storing computer-executable instructions which, when executed by the computer 1100, perform the various routines described above with regard to FIGS. 5-8. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

Based on the foregoing, it should be appreciated that technologies for using a model 150 of an infrastructure to generate configuration data 114 usable in a service provider network 120 have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive resource data relating to a network, the resource data based at least, in part, on physical components of a physical model within a physical environment external to the network, the physical components being arranged to represent an infrastructure that operates in the network, the resource data identifying resources that are provided by the network, wherein an individual resource provided by the network is represented by an individual physical component of the physical model external to the network;
   receive connection data, the connection data based at least, in part, on an arrangement of the physical components of the physical model within the physical environment external to the network, the connection data identifying connections between at least a portion of the identified resources that are represented by the physical components of the physical model;
   generate configuration data that describes a configuration of the infrastructure within the network, the configuration data generated at least, in part, on the identified resources and the identified connections; and
   perform one or more actions using the configuration data comprising providing the configuration data to a service for provisioning the infrastructure in the network.

2. The non-transitory computer-readable storage medium of claim 1, wherein different physical components of the physical model represent different resources provided by the network.

3. The non-transitory computer-readable storage medium of claim 1, wherein receive the resource data comprises receiving second resource data in response to a change to at least one physical component of the physical model.

4. The non-transitory computer-readable storage medium of claim 1, wherein one or more of the physical components of the physical model includes a physical hardware setting configured to receive a parameter setting associated with one or more of the identified resources.

5. The non-transitory computer-readable storage medium of claim 1, wherein the physical model comprises physical components that represent one or more of a virtual computing resource, a database resource, a storage resource, a security resource, an auto-scale resource, or a networking resource.

6. The non-transitory computer-readable storage medium of claim 1, wherein performing the one or more actions using the configuration data comprises sending operating data from the network to the physical model external to the network, the operating data used to provide an indication of an operating state of at least one of the resources provisioned in the network.

7. A system, comprising:
   a physical model including an arrangement of physical components relating to a network within a physical environment outside the network, wherein the physical components represent one or more resources to provision in the network; and one or more computers configured to:
- analyze infrastructure data associated with the physical model within the physical environment outside the network, the infrastructure data identifying the one or more resources to provision in the network, the infrastructure data generated based at least, in part, on the arrangement of the physical components of the physical model outside the network,
- use at least a portion of the infrastructure data to generate configuration data describing a configuration of the one or more resources within the network, and
- perform one or more actions using the configuration data comprising providing the configuration data to a service for provisioning the one or more resources in the network.

8. The system of claim 7, wherein performing the one or more actions using the configuration data comprises providing the configuration data to a deployment component configured to utilize the configuration data to provision the one or more resources.

9. The system of claim 7, wherein analyze the infrastructure data comprises identifying connection data that identifies connections between the one or more resources that are represented by the physical components of the physical model, the connections identified based at least, in part, on the arrangement of the physical components.

10. The system of claim 7, wherein identify the infrastructure data comprises
- utilizing a camera to obtain an image of the physical model; and
- programmatically analyzing the image to identify the one or more resources.

11. The system of claim 7, wherein the physical model is configured to transmit the infrastructure data to the one or more computers and to receive operating data from the one or more computers after the one or more resources are provisioned in the network, the operating data used to provide an indication of an operating state of at least one of the resources provisioned in the network.

12. The system of claim 7, wherein the physical model is configured to transmit infrastructure data to the one or more computers in response to a change made to one or more of the physical components of the physical model.

13. The system of claim 7, wherein perform one or more actions using the configuration data comprises causing one or more virtual machine instances to be launched in the network based, at least in part, on the configuration data.

14. The system of claim 7, wherein at least one of the physical components of the physical model includes a hardware setting that is configured to receive an input that is associated with a parameter of at least one of the one or more resources represented by the physical components of the physical model.

15. The system of claim 7, wherein the physical components of the physical model are configured to communicate with each other.

16. A computer-implemented method, comprising:
- detecting that a physical component is associated with a physical model in a physical environment external to a network, the physical model representing an infrastructure of the network using an interconnection of physical components;
- programmatically identifying a resource that is associated with the physical component;
- generating infrastructure data associated with the physical model, the generated infrastructure data based at least, in part, on an arrangement of the physical component in relation to another physical component of the physical model external to the network, the infrastructure data identifying the resource in the network associated with the physical component external to the network; and
- providing the infrastructure data to a service for generating a deployment template based, at least in part, on the infrastructure data and for provisioning the resource using the deployment template.

17. The computer-implemented method of claim 16, wherein generating the infrastructure data comprises generating connection data based, at least in part, on a physical layout of the physical components within the physical model, the connection data identifying one or more connections between the resource and other resources that are represented by different physical components of the physical model.

18. The computer-implemented method of claim 16, further comprising detecting a change to a hardware setting associated with the physical component and adjusting a value of a parameter associated with the resource based on the change.

19. The computer-implemented method of claim 16, further comprising providing an indication of an operating state of at least one resource provisioned in the network, the indication provided by the physical model.

20. The computer-implemented method of claim 16, wherein the detecting comprises receiving an electrical signal generated by the physical component.

* * * * *